(12) United States Patent
Bookbinder et al.

(10) Patent No.: US 11,175,450 B2
(45) Date of Patent: Nov. 16, 2021

(54) HALOGEN CO-DOPED OPTICAL FIBERS

(71) Applicant: CORNING INCORPORATED, Corning, NY (US)

(72) Inventors: Dana Craig Bookbinder, Corning, NY (US); Steven Bruce Dawes, Corning, NY (US); Phong Diep, Ithaca, NY (US); Brian Lee Harper, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 14 days.

(21) Appl. No.: 16/529,179

(22) Filed: Aug. 1, 2019

(65) Prior Publication Data

US 2020/0049881 A1 Feb. 13, 2020

Related U.S. Application Data

(60) Provisional application No. 62/715,938, filed on Aug. 8, 2018.

(51) Int. Cl.
  G02B 6/028 (2006.01)
  C03B 37/014 (2006.01)
  G02B 6/036 (2006.01)

(52) U.S. Cl.
  CPC ...... *G02B 6/0281* (2013.01); *C03B 37/01453* (2013.01); *G02B 6/03627* (2013.01);
  (Continued)

(58) Field of Classification Search
  CPC ............ C03B 2201/12; C03B 2201/20; C03B 37/01453; C03B 2203/22; G02B 6/0281
  See application file for complete search history.

(56) References Cited

U.S. PATENT DOCUMENTS 6,917,740 B2 * 7/2005 Boek ................. C03B 37/01446
  385/123
9,594,210 B2 * 3/2017 Bookbinder ...... C03B 37/01446
  (Continued)

FOREIGN PATENT DOCUMENTS

WO  2016168042 A1  10/2016
WO  2019100047 A1  5/2019

OTHER PUBLICATIONS

International Search Report and Written Opinion of the European International Searching Authority; PCT/US2019/044583; dated Oct. 14, 2019; 12 pgs.

(Continued)

*Primary Examiner* — Thomas A Hollweg
*Assistant Examiner* — Mary A El-Shammaa
(74) *Attorney, Agent, or Firm* — Kevin L. Bray

(57) ABSTRACT

A method of forming an optical fiber, including: exposing a soot core preform to a dopant gas at a pressure of from 1.5 atm to 40 atm, the soot core preform comprising silica, the dopant gas comprising a first halogen doping precursor and a second halogen doping precursor, the first halogen doping precursor doping the soot core preform with a first halogen dopant and the second halogen precursor doping the soot core preform with a second halogen dopant; and sintering the soot core preform to form a halogen-doped closed-pore body, the halogen-doped closed-pore body having a combined concentration of the first halogen dopant and the second halogen dopant of at least 2.0 wt %.

23 Claims, 9 Drawing Sheets

(52) U.S. Cl.
CPC ...... *C03B 2201/12* (2013.01); *C03B 2201/20* (2013.01); *C03B 2203/22* (2013.01)

(56) References Cited

U.S. PATENT DOCUMENTS

| | | | |
|---|---|---|---|
| 9,594,212 B2 | 3/2017 | Bookbinder et al. | |
| 9,618,692 B2 | 4/2017 | Berkey et al. | |
| 10,215,915 B2* | 2/2019 | Bookbinder | ....... G02B 6/03611 |
| 10,429,589 B2* | 10/2019 | Bookbinder | ......... G02B 6/3833 |
| 10,444,427 B2* | 10/2019 | Bookbinder | ....... G02B 6/03644 |
| 10,571,628 B2* | 2/2020 | Bookbinder | ......... G02B 6/0281 |
| 10,591,668 B2* | 3/2020 | Bookbinder | ....... G02B 6/03644 |
| 10,656,326 B2* | 5/2020 | Sakuma | ................... G02B 6/02 |
| 2003/0079504 A1 | 5/2003 | Boek et al. | |
| 2006/0130529 A1* | 6/2006 | Bookbinder | ............ C03B 23/04 65/394 |
| 2016/0011365 A1* | 1/2016 | Berkey | ............. C03B 37/01853 385/127 |
| 2016/0168008 A1 | 6/2016 | Bookbinder et al. | |
| 2016/0304392 A1 | 10/2016 | Bookbinder et al. | |
| 2017/0022094 A1* | 1/2017 | Yan | ........................... C03C 3/06 |
| 2017/0176673 A1* | 6/2017 | Berkey | ................. C03B 37/025 |
| 2017/0362115 A1* | 12/2017 | Dawes | ................... G02B 6/036 |
| 2018/0031762 A1* | 2/2018 | Bookbinder | ....... G02B 6/03666 |
| 2019/0154911 A1 | 5/2019 | Bookbinder et al. | |
| 2020/0012041 A1* | 1/2020 | Ichii | ...................... G02B 6/036 |

OTHER PUBLICATIONS

Kim et al.; "Fictive Temperature of Silica Glass Fiber,—Re-Examination"; Journal of Non-Crystalline Solids; 286, (2001) 132-138.

* cited by examiner

HALOGEN CO-DOPED OPTICAL FIBERS

This application claims the benefit of priority to U.S. Provisional Application Ser. No. 62/715,938 filed on Aug. 8, 2018, the content of which is relied upon and incorporated herein by reference in its entirety.

FIELD OF THE DISCLOSURE

The present disclosure generally relates to optical fibers, and more specifically to optical fibers co-doped with halogens.

BACKGROUND

Doping of a core region of a silica-based optical fiber with halogens has been used for lowering attenuation in optical fibers. However, when doping of the core region using chlorine is done, doping at atmospheric pressure results in an insufficient amount refractive index delta with respect to a silica cladding needed for a well-guided waveguide. To achieve enough of an index differential between a chlorine-doped core and a silica cladding, chlorine doping of the core may be carried out at pressures exceeding 40 atmospheres. Such high pressures are difficult to implement in practice and there remains a need to identify alternate procedures for reducing attenuation in optical fibers.

SUMMARY OF THE DISCLOSURE

According to at least one feature of the present disclosure, a method of forming an optical fiber includes: doping a soot core preform with a dopant gas at a pressure of from 1.5 atm to 40 atm, the soot core preform comprising silica, the dopant gas comprising a first halogen doping precursor and a second halogen doping precursor, the first halogen doping precursor doping the soot core preform with a first halogen dopant and the second halogen precursor doping the soot core preform with a second halogen dopant; and sintering the soot core preform to form a halogen-doped closed-pore body, the halogen-doped closed-pore body having a combined concentration of the first halogen dopant and the second halogen dopant of at least 2.0 wt %.

According to at least one feature of the present disclosure, a method of forming an optical fiber includes: doping a soot core preform with a dopant gas at a pressure of from about 1.5 atm to about 40 atm, the soot core preform comprising silica, the dopant gas comprising a Cl doping precursor and a second halogen doping precursor, the Cl doping precursor doping the soot core preform with a Cl dopant and the second halogen precursor doping the soot core preform with a second halogen dopant; and sintering the soot core preform to form a halogen-doped closed-pore body, the halogen-doped closed-pore body having a combined concentration of the Cl dopant and the second halogen dopant of at least 1.0 wt %, wherein a co-doping ratio of the Cl dopant weight % as % of the total halogen dopant weight % is in the range from about 20% to about 90%.

According to at least one feature of the present disclosure, an optical fiber, includes a cladding. A core is positioned within the cladding and includes a Cl dopant and at least one other halogen dopant. The core includes a combined concentration of the Cl dopant and the second halogen dopant is in the range from 2.0 wt % to 7.5 wt %. The Cl dopant weight % as % of the total halogen dopant weight % is in the range from about 20% to about 90%.

According to another feature of the present disclosure, an optical fiber includes a cladding. A core is positioned within the cladding. The core includes Cl and a second halogen dopant. The Cl and the second halogen dopant has a combined concentration in the core in a range from 2.0 wt % to 7.5 wt %. The Cl has a halogen co-doping ratio in a range from 20% to 90% in the core.

The present disclosure extends to:

A method of forming an optical fiber, comprising:

exposing a soot core preform with a dopant gas at a pressure of from 1.5 atm to 40 atm, the soot core preform comprising silica, the dopant gas comprising a first halogen doping precursor and a second halogen doping precursor, the first halogen doping precursor doping the soot core preform with a first halogen dopant and the second halogen precursor doping the soot core preform with a second halogen dopant; and sintering the soot core preform to form a halogen-doped closed-pore body, the halogen-doped closed-pore body having a combined concentration of the first halogen dopant and the second halogen dopant of at least 2.0 wt %.

The present disclosure extends to:

A method of forming an optical fiber, comprising:

exposing a soot core preform to a dopant gas at a pressure of from about 1.5 atm to about 40 atm, the soot core preform comprising silica, the dopant gas comprising a Cl doping precursor and a second halogen doping precursor, the Cl doping precursor doping the soot core preform with a Cl dopant and the second halogen precursor doping the soot core preform with a second halogen dopant; and sintering the soot core preform to form a halogen-doped closed-pore body, the halogen-doped closed-pore body having a combined concentration of the Cl dopant and the second halogen dopant of at least 2.0 wt %, wherein the Cl dopant has a halogen co-doping ratio in a range from 20% to 90%.

The present disclosure extends to:

An optical fiber, comprising:

a cladding; and a core positioned within the cladding, the core comprising a Cl dopant and a second halogen dopant, the Cl dopant and the second halogen dopant having a combined concentration in the core in a range from 2.0 wt % to 7.5 wt %, the Cl dopant having a halogen co-doping ratio in a range from 20% to 90% in the core.

These and other features, advantages, and objects disclosed herein will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 6 is a plot of $SiCl_4$ and $SiBr_4$ partial pressures vs. relative refractive index increase.

DETAILED DESCRIPTION

Figure 1:
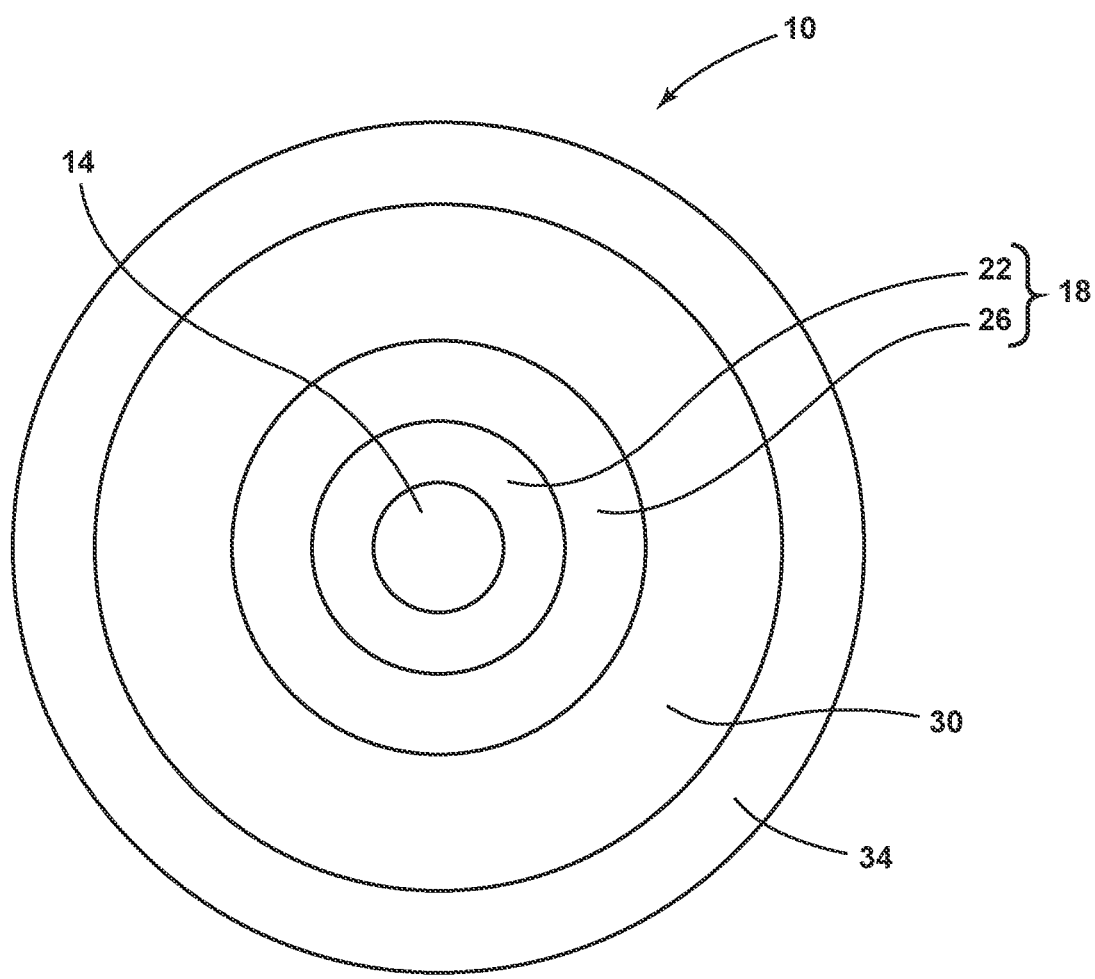
FIG. 1 is a schematic depiction of a cross-section of an optical fiber, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The construction and arrangement of the elements of the present disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The terms "µm" and "micron" are used interchangeably herein.

The "refractive index profile" is the relationship between refractive index or relative refractive index and fiber radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded, sloped, or otherwise slightly deviate from perfect step function characteristics. It is further understood in some embodiments that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index percent", also referred to herein as "relative refractive index", is defined in Equation (1) below as:

$$\Delta\% = 100 \times (n_i^2 - n_c^2)/2n_i^2 \qquad (1)$$

here $n_c$ is the refractive index of undoped silica at 1550 nm and $n_i$ is the refractive index at 1550 nm at point i having radial coordinate $r_i$ in a particular region of the optical fiber.

As further used herein, the relative refractive index is represented by $\Delta$ and its values are given in units of "%", unless otherwise specified. The terms $\Delta$, % $\Delta$, $\Delta$ %, delta index, percent index, percent delta index and % are used interchangeably herein. In cases where the refractive index of a region is less than the refractive index of undoped silica, the relative refractive index is negative. Regions with a negative relative refractive index are referred to as depressed regions and are said to have a depressed relative refractive index. In cases where the refractive index is greater than the refractive index of undoped silica, the relative refractive index is positive. An "up-dopant" is herein considered to be a dopant which has a propensity to raise the refractive index relative to undoped silica. A "down-dopant" is herein considered to be a dopant which has a propensity to lower the refractive index relative to undoped silica. Examples of up-dopants include $GeO_2$, $Al_2O_3$, $P_2O_5$, $TiO_2$, Cl, Br and I. Examples of down-dopants include F and B.

The term "alpha" or "α-profile" refers to a relative refractive index profile, expressed in terms of Δ(r). Δ(r) is in units of "%," where r is the radial coordinate, and follows Equation (3) as follows:

$$\Delta(r) = \Delta_{1max}\left[1 - \left(\frac{r}{r_1}\right)^{\alpha}\right] \quad (3)$$

where $\Delta_{1max}$ is the peak relative refractive index in the core region of the fiber (i.e., core delta), and $r_1$ is the core radius. Alpha as reported herein is measured at 1550 nm. An α=1 corresponds to a triangular relative refractive index profile, an α=2 describes a parabolic relative refractive index profile, and α>12 corresponds to a relative refractive index profile approaching a step index (i.e., a "step-like index profile" as used herein) profile. Accordingly, α=∞ corresponds to a pure step-index profile.

"Trench volume" is defined as:

$$V_{Trench} = |2\int_{r_{Trench,inner}}^{r_{Trench,outer}} \Delta_{Trench}(r) r dr|$$

where $r_{Trench,inner}$ is the inner radius of the trench region of the relative refractive index profile, $r_{Trench,outer}$ is the outer radius of the trench region of the relative refractive index profile, $\Delta_{Trench}(r)$ is the relative refractive index of the trench region of the relative refractive index profile, and r is radial position in the fiber. Trench volume is in absolute value and is a positive quantity expressed herein in units of % Δmicron², % Δ-micron², % Δ-μm², or % Δμm², whereby these units can be used interchangeably herein. Unless otherwise noted herein, optical properties (such as dispersion, attenuation, etc.) are reported for the $LP_{01}$ mode.

"Radial position" or the radial coordinate "r" refers to radial position relative to the centerline (r=0) of the fiber. The length dimension "micron" may be referred to herein as micron (or microns) or μm. Areal dimensions based on microns may be referred to herein as micron² or μm².

Referring now to FIG. 1, depicted is an optical fiber 10 having a core (or core region) 14 and a cladding (or cladding region) 18. The cladding 18 may include an inner cladding (or inner cladding region) 22 and an outer cladding (or outer cladding region) 26, but it will be understood that the cladding 18 may be a single, substantially homogenous, layer. According to various examples, the optical fiber 10 may include a primary coating 30 and a secondary coating 34 positioned around the cladding 18.

The core 14 and the cladding 18 may substantially include $SiO_2$ in the form of silica glass. According to various examples, the core 14 may include two or more dopants configured to increase or decrease the refractive index of the core 14 relative to undoped $SiO_2$. In such examples, the core 14 may be said to be co-doped. According to various examples, the core 14 may be doped with two or more halogen dopants. Exemplary halogen dopants include F, Cl, Br and I. Table 1 provides a list of the impact on the relative refractive index (%) per weight percent (wt %) dopant for a variety of halogens as compared to undoped $SiO_2$.

TABLE 1

| Dopant | Impact on Relative Refractive Index (%) per wt % dopant |
| --- | --- |
| F | −0.3 |
| Cl | 0.065 |
| Br | 0.105 |

Chlorine (Cl), as a dopant in the core 14, generally increases the relative refractive index and may have a low effect on Rayleigh scattering due to the relatively small size of the Cl atoms. However, as Cl has a relatively low impact on the relative refractive index, a relatively large wt % of Cl may be necessary to sufficiently increase the refractive index of the core 14 such that the optical fiber 10 may be a well-guided waveguide. In instances where Cl is the sole dopant, relatively high doping pressures may be necessary to achieve sufficient wt % of Cl in the core 14 to produce a well guided optical fiber 10 when using undoped silica as cladding 18. Larger atomic weight halogen dopants such as Br (Bromine) and I (Iodine) have a greater impact on the relative refractive index of the core 14 and can be doped to greater quantities at lower pressure. However, the larger size of Br and I may lead to greater Rayleigh scattering and an increase in fiber attenuation (i.e., due to the larger atomic size of the Br and I atoms). Accordingly, doping the core 14 of the optical fiber 10 with two or more of the halogen dopants and tailoring of the relative amounts of the different halogen dopants may be advantageous in producing an optical fiber 10 which exhibits an attenuation within established specifications while utilizing low doping pressures.

The total doping concentration of all halogen dopants in the core 14 (i.e., a total weight percent (wt %) of halogen dopants in the core 14) may be greater than 2.0 wt %, or greater than 3.0 wt %, or greater than 4.0 wt %, or greater than 5.0 wt %, or from about 2.0 wt % to about 8.0 wt %, or from about 2.0 wt % to about 7.5 wt %, or from about 3.0 wt % to about 8.0 wt %, or from about 3.0 wt % to about 7.8 wt %, or from about 3.0 wt % to about 7.6 wt %, or from about 3.0 wt % to about 7.4 wt %, or from about 3.0 wt % to about 7.2 wt %, or from about 3.0 wt % to about 7.0 wt %, or from about 3.0 wt % to about 6.8 wt %, or from about 3.0 wt % to about 6.6 wt %, or from about 3.0 wt % to about 6.4 wt %, or from about 3.0 wt % to about 6.2 wt %, or from about 3.0 wt % to about 6.0 wt %, or from about 3.0 wt % to about 6.0 wt %, or from about 3.0 wt % to about 5.8 wt %, or from about 3.0 wt % to about 5.6 wt %, or from about 3.0 wt % to about 5.4 wt %, or from about 3.0 wt % to about 5.2 wt %, or from about 3.0 wt % to about 5.0 wt %, or from about 3.0 wt % to about 4.8 wt %, or from about 3.0 wt % to about 4.6 wt %, or from about 3.0 wt % to about 4.4 wt %, or from about 3.0 wt % to about 4.2 wt %, or from about 3.0 wt % to about 4.0 wt %, or from about 3.0 wt % to about 3.8 wt %, or from about 3.0 wt % to about 3.6 wt % or any and all values and ranges therebetween.

The doping concentration of any of the halogen dopants individually (i.e., any one of F, Cl, Br and I) in the core 14 may be from 0.2 wt % to about 4.0 wt %, or from about 0.5 wt % to about 4.0 wt %, or from about 1.0 wt % to about 3.5 wt %, or from about 1.5 wt % to about 3.0 wt %, or from about 1.75 wt % to about 2.75 wt %. For example, any of F, Cl, Br or I individually may have a dopant concentration in the core 14 of about 0.2 wt %, or about 0.4 wt %, or about 0.6 wt %, or about 0.8 wt %, or about 1.0 wt %, or about 1.2 wt %, or about 1.4 wt %, or about 1.6 wt %, or about 1.8 wt %, or about 2.0 wt %, or about 2.2 wt %, or about 2.4 wt %, or about 2.6 wt %, or about 2.8 wt %, or about 3.0 wt %, or about 3.2 wt %, or about 3.4 wt %, or about 3.6 wt %, or about 3.8 wt %, or about 4.0 wt % or any and all values and ranges therebetween.

In one embodiment, each of two or more halogen dopants is distributed uniformly throughout the co-doped core 14 to provide a uniform relative refractive index throughout the co-doped core 14. In another embodiment, one or more of the halogen dopants is distributed non-uniformly throughout the co-doped core 14 such that the relative refractive index varies continuously throughout the co-doped core 14 without a discontinuity (e.g. step change) in relative refractive index. In this embodiment, the two or more halogen co-dopants are interspersed or intermixed such that each halogen co-dopant is present and distributed throughout the co-doped core 14 and co-doped core 14 includes regions that are locally rich and locally lean of one or more of the halogen co-dopants. By locally rich is meant a concentration of halogen co-dopant above the average concentration of the halogen co-dopant in the co-doped core 14 and by locally lean is meant a concentration of halogen co-dopant below the average concentration of the halogen co-dopant in the co-doped core 14.

The halogen doping of the co-doped core 14 may be described by a "halogen co-doping ratio." The halogen co-doping ratio is the wt % of an individual halogen dopant divided by the total wt % of all halogen dopants in the core 14 and is expressed herein as a percent. For example, if the total concentration of all halogen dopants in the core is 3.0 wt % and the halogen co-doping ratio of Cl is 50%, the concentration of Cl in the core is 1.5 wt %. By way of a second example, if the core 14 is co-doped with Cl and F and the concentration of Cl in the core is 1.0 wt % and the concentration of F in the core is 1.5 wt %, the total halogen concentration is 2.5 wt %, the halogen co-doping ratio of Cl is 40% and the halogen co-doping ratio of F is 60%.

The halogen co-doping ratio of Cl in the core 14 may be from about from about 10% to about 90%, or from about 20% to about 90%, or from about 15% to about 85%, or from about 20% to about 80%, or from about 20% to about 60%, or from about 25% to about 75%, or from about 30% to about 70%, or from about 35% to about 65%, or from about 40% to about 60%, or from about 45% to about 55%. Further, the halogen co-doping ratio of Cl in the core 14 may be about 20% or greater, or about 30% or greater, or about 40% or greater, or about 50% or greater, or about 60% or greater, or about 70% or greater, or about 80% or greater, or about 90% or less, or about 80% or less, or about 70% or less, or about 60% or less, or about 50% or less, or about 40% or less, or about 30% or less, or about 20% or less. It will be understood that any and all values therebetween are contemplated. Further, F, Br and/or I may have any of the halogen co-doping ratios listed above in connection with Cl. It will be further understood that any of the halogen co-doping ratios listed above in connection with Cl in core 14 also apply to soot core preforms and closed-pore core bodies doped with any combination of two or more of Cl, F, Br, and I.

The cladding 18 may be undoped silica or may be silica doped with one or more halogen dopants. For example, both the inner cladding 22 and the outer cladding 26 may be undoped silica. In another example, the inner cladding 22 may include a halogen dopant and the outer cladding 26 may be undoped silica. In another example, the inner cladding 22 may be undoped silica and the outer cladding 26 may include a halogen dopant. In yet another example, both the inner cladding 22 and outer cladding 26 may include a halogen dopant.

The cladding 18 may include an up-dopant and/or a down-dopant. For example, the inner cladding 22 and/or the outer cladding 26 may be doped with F. The doping concentration of F in the inner cladding 22 and/or the outer cladding 26 may be in a range from about 0.01 wt % to about 2.0 wt %, or from about 0.01 wt % to about 1.5 wt %, or from about 0.01 wt % to about 1.0 wt %, or from about 0.01 wt % to about 0.80 wt %, or from about 0.05 wt % to about 0.50 wt %, or from about 0.05 wt % to about 0.4 wt %, or from about 0.05 wt % to about 0.25 wt %. According to various examples, the inner cladding 22 and/or outer cladding 26 may be doped with an up-dopant. For example, the inner cladding 22 and/or the outer cladding 26 may be doped with an up-dopant (e.g., Cl, Br, I, and/or Ge) to a concentration of from about 0.01 wt % to about 3.0 wt %, or from about 0.01 wt % to about 2.5 wt %, or from about 0.01 wt % to about 2.0 wt %, or from about 0.01 wt % to about 1.5 wt %, or from about 0.01 wt % to about 1.0 wt %, or from about 0.01 wt % to about 0.05 wt %.

According to various examples, the core 14 of the optical fiber 10 can be optimized for low attenuation performance in both single and few-mode configurations by limiting the $GeO_2$, $K_2O$ and/or $TiO_2$ content in the fiber 10. Further, the minimizing or elimination of Ge, K and Ti in the core 14 can improve the attenuation performance of the optical fiber 10 by reducing the effects of Rayleigh scattering. For example, the core 14 may contain about 1.0 wt % or less, or about 0.5 wt % or less, or about 0.1 wt % or less or about 0.0 wt % of $GeO_2$, $K_2O$, or $TiO_2$, alone or in combination. In some embodiments, the core is free of $GeO_2$, $K_2O$ or $TiO_2$.

Co-doping of the core 14 with multiple halogens may reduce the viscosity of the glass of the core 14 which may enable increased glass relaxation during fiber drawing. These low viscosity levels contribute to a reduction in the fictive temperature and density fluctuations within the core 14, thereby reducing Rayleigh scattering effects in the core 14 of the optical fiber 10. For purposes of the present description, the fictive temperature will be used as an indicator of glass structure. Glasses with high fictive temperature have structures that are further removed from equilibrium than glasses with low fictive temperature. Processing conditions that lower the fictive temperature of the glass produce optical fibers with structures that more closely approach equilibrium. Optical fibers with low fictive temperatures are expected to exhibit low attenuation. The fictive temperature is the temperature at which the glass structure is at equilibrium. It can be measured via IR (infrared) spectroscopy, using for example the method described in D. L. Kim and M. Tomozawa, "Fictive Temperature of Silica Glass Fiber, —Reexamination," Journal of Non-Crystalline Solids, 286, (2001) 132-138. As described herein, fictive temperature is the average radial fictive temperature of the optical fiber 10.

Use of the core 14 co-doped with two or more halogens may lower the fictive temperature of the core 14. For example, a core 14 doped with about 1.5 wt % Cl and about 0.6 wt % F may have a fictive temperature which is reduced by greater than about 1° C., or about 5° C., or about 10° C., or about 12° C., or about 14° C., or about 16° C., or about 18° C., or about 20° C., or about 22° C., or about 24° C., or about 25° C. as compared to the fictive temperature of core 14 doped with only 1.8 wt % Cl.

The core 14 may have an unannealed fictive temperature of from about 1050° C. to about 1125° C., or from about 1050° C. to about 1110° C., or from about 1060° C. to about 1110° C., or from about 1070° C. to about 1110° C., or from about 1080° C. to about 1110° C., or from about 1090° C. to about 1110° C., or from about 1100° C. to about 1110° C. For example, the unannealed fictive temperature of the core 14 may be about 1050° C., or about 1055° C., or about 1060° C., or about 1065° C., or about 1070° C., or about 1075° C., or about 1080° C., or about 1085° C., or about 1090° C., or about 1095° C., or about 1100° C., or about 1105° C., or about 1110° C. or any and all values and ranges therebetween. The unannealed fictive temperature corresponds to the fictive temperature of core 14 in the closed-pore state formed in the process described in connection with FIG. 3 below without further heat treatment.

Use of the co-doped core 14 may lower a post-annealed fictive temperature of the core 14. For example, the optical fiber 10 may have a core 14 doped with about 1.5 wt % Cl and about 0.6 wt % F and annealed with an annealing schedule of ramping the fiber 10 to a temperature of 1200° C. as fast as possible, holding the optical fiber 10 at a temperature of 1200° C. for 1 hour, ramping the optical fiber 10 to a temperature of 900° C. at a rate of 100° C. per hour and ramping to room temperature at furnace rate (i.e. natural cooling rate in the furnace when the furnace is turned off). Such an example of an optical fiber 10 may have a post-annealed fictive temperature which is lower than a comparative optical fiber 10 having 1.8 wt % Cl in the core 14 subjected to the same annealing schedule by greater than about 1° C., or about 5° C., or about 10° C., or about 12° C., or about 14° C., or about 16° C., or about 18° C., or about 20° C., or about 22° C., or about 24° C., or about 25° C., or about 30° C., or about 35° C., or about 40° C., or about 45° C., or about 50° C., or about 55° C., or about 60° C., or about 65° C., or about 70° C., or about 75° C., or about 80° C., or about 85° C. The core 14 may have post-annealed fictive temperature of from about 850° C. to about 950° C., or from about 860° C. to about 940° C., or from about 870° C. to about 930° C., or from about 880° C. to about 920° C., or from about 890° C. to about 910° C., or from about 890° C. to about 1000° C. For example, the post-annealed fictive temperature of the core 14 may be about 850° C., or about 855° C., or about 860° C., or about 865° C., or about 870° C., or about 875° C., or about 880° C., or about 885° C., or about 890° C., or about 895° C., or about 1000° C., or about 1005° C., or about 1010° C. or any and all values and ranges therebetween.

The optical fiber 10 employing the co-doped core 14 may have an attenuation at 1550 nm of less than about 0.180 dB/km, or less than about 0.175 dB/km, or less than about 0.170 dB/km, or less than about 0.165 dB/km, or less than about 0.160 dB/km. less than about 0.155 dB/km. The optical fiber 10 employing the co-doped core 14 may have an attenuation at 1330 nm of less than about 0.325 dB/km, or less than about 0.320 dB/km, or less than about 0.315 dB/km, or less than about 0.310 dB/km, or less than about 0.305 dB/km.

Referring now to FIGS. 2A-2D, depicted are relative refractive index profiles for a variety of optical fibers 10 of the present disclosure.

Figure 2A:
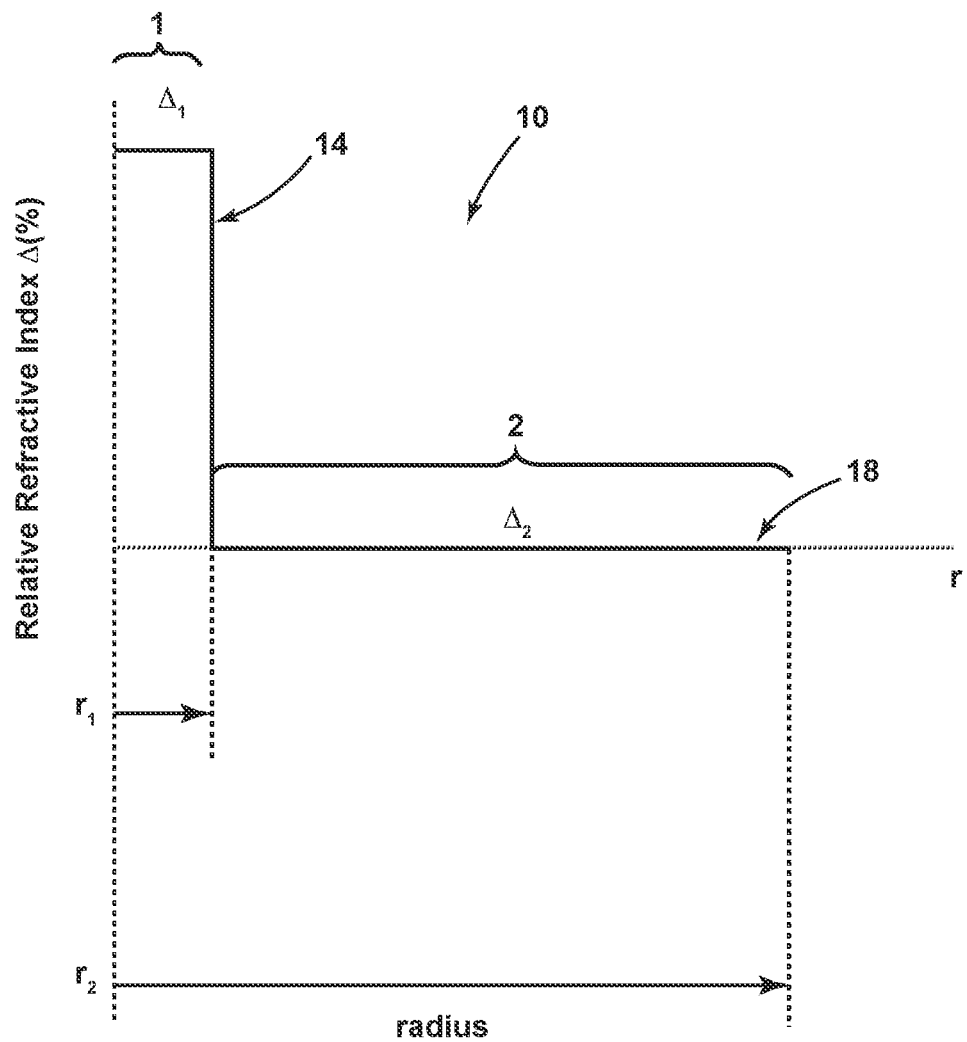
FIG. 2A is a schematic depiction of a relative refractive index profile for an optical fiber having a core and a cladding, according to at least one example.

Referring now to FIG. 2A, depicted is a first example of a refractive index profile of the optical fiber 10 obtained by up-doping silica glass of the core 14 with two or more halogen dopants (e.g., F, Cl, Br and/or I) and using undoped or pure silica glass for the cladding 18. In the depicted example, the cladding 18 is a single homogenous layer such that the inner cladding 22 and the outer cladding 26 are combined and have the same relative refractive index. The relative refractive index $\Delta_1$ of the core 14 may be from about 0.10% to 0.50%, or from about 0.20% to 0.45%. For example, the relative refractive index $\Delta_1$ of the core 14 may be about 0.10%, or about 0.15%, or about 0.20%, or about 0.25%, or about 0.30%, or about 0.35%, or about 0.40%, or about 0.45%, or about 0.50% or any and all values and ranges therebetween. The radius $r_1$ of the core 14 may be from about 3 μm to about 8 μm, or from about 4 μm to about 6 μm. When cladding 18 is undoped silica glass, the relative refractive index $\Delta_2$ is 0%.

In some aspects, cladding 18 is a homogeneous layer that includes an updopant or downdopant and the relative refractive index $\Delta_2$ of the cladding 18 may be from about −0.35% to about 0.20%, or from about −0.15% to about 0.15%, or from about −0.10% to about 0.10%, or from about −0.05% to about 0.05%. For example, the relative refractive index $\Delta_2$ of the cladding 18 may be about −0.35%, or about −0.30%, or about −0.25%, or about −0.20%, or about −0.15%, or about −0.10%, or about −0.05%, or about 0.00%, or about 0.05%, or about 0.10%, or about 0.15%, or about 0.20% or any and all values and ranges therebetween.

In other aspects, cladding 18 includes inner cladding 22 and outer cladding 26, wherein inner cladding 22 and outer cladding 26 are compositionally distinct. In one aspect, one of inner cladding 22 and outer cladding 26 is undoped silica and the other of inner cladding 22 and outer cladding 26 is doped silica having a relative refractive index as listed above for the relative refractive index $\Delta_2$ of cladding 18 as a homogeneous layer.

The radius $r_2$ of the cladding 18 may be from about 55 μm to about 70 μm, or from about 60 μm to about 65 μm. According to a specific example, the radius $r_2$ of the cladding 18 may be about 62.5 μm. A relative refractive index profile such as the one presented in FIG. 2A may be referred to as a "step" profile.

Figure 2B:
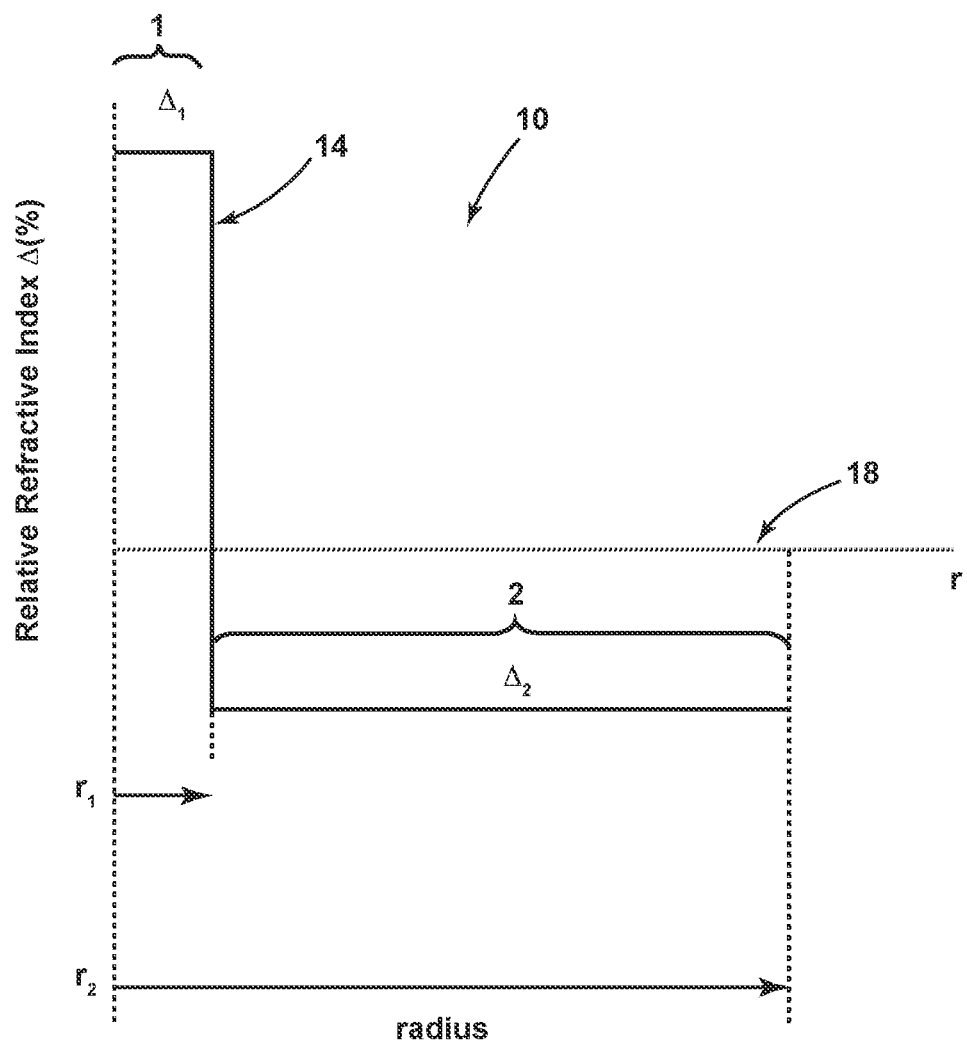
FIG. 2B is a schematic depiction of a relative refractive index profile for an optical fiber having a core and a cladding, according to at least one example.

Referring now to FIG. 2B, depicted is an example of the optical fiber 10 obtained by updoping silica glass of the core 14 with two or more halogen dopants (e.g., F, Cl, Br and/or I) and using down-doped (e.g., F-doped) silica glass for the cladding 18. In the depicted example, the cladding 18 is a single homogenous layer such that the inner cladding 22 and the outer cladding 26 are combined and have the same relative refractive index. The relative refractive index $\Delta_1$ of the core 14 may be from about 0.10% to 0.50%, or from about 0.20%-0.45%. For example, the relative refractive index $\Delta_1$ of the core 14 may be about 0.10%, or about 0.15%, or about 0.20%, or about 0.25%, or about 0.30%, or about 0.35%, or about 0.40%, or about 0.45%, or about 0.50% or any and all values and ranges therebetween. The radius $r_1$ of the core 14 may be from about 3 μm to about 8 μm, or from about 4 μm to about 6 μm. The relative refractive index $\Delta_2$ of the cladding 18 may be from about −0.40% to −0.01%, or from about −0.35% to about −0.01%, or from about −0.30% to about −0.01%, or from about −0.25% to about −0.01%, or from about −0.20% to about −0.01%, or from about −0.15% to about −0.01%, or from about −0.10% to about −0.01%, or from about −0.05% to about −0.01%. For example, the relative refractive index $\Delta_2$ of the cladding 18 may be about −0.40%, or about −0.35%, or about −0.30%, or about −0.25%, or about −0.20%, or about −0.15%, or about −0.10%, or about −0.05%, or about 0.00% or any and all values and ranges therebetween. The radius $r_2$ of the cladding 18 may be from about 55 μm to about 70 μm, or from about 60 μm to 65 μm. According to a specific example, the radius $r_2$ of the cladding 18 may be about 62.5 μm. A relative refractive index profile such as the one presented in FIG. 2B may be referred to as a "step" profile.

Figure 2C:
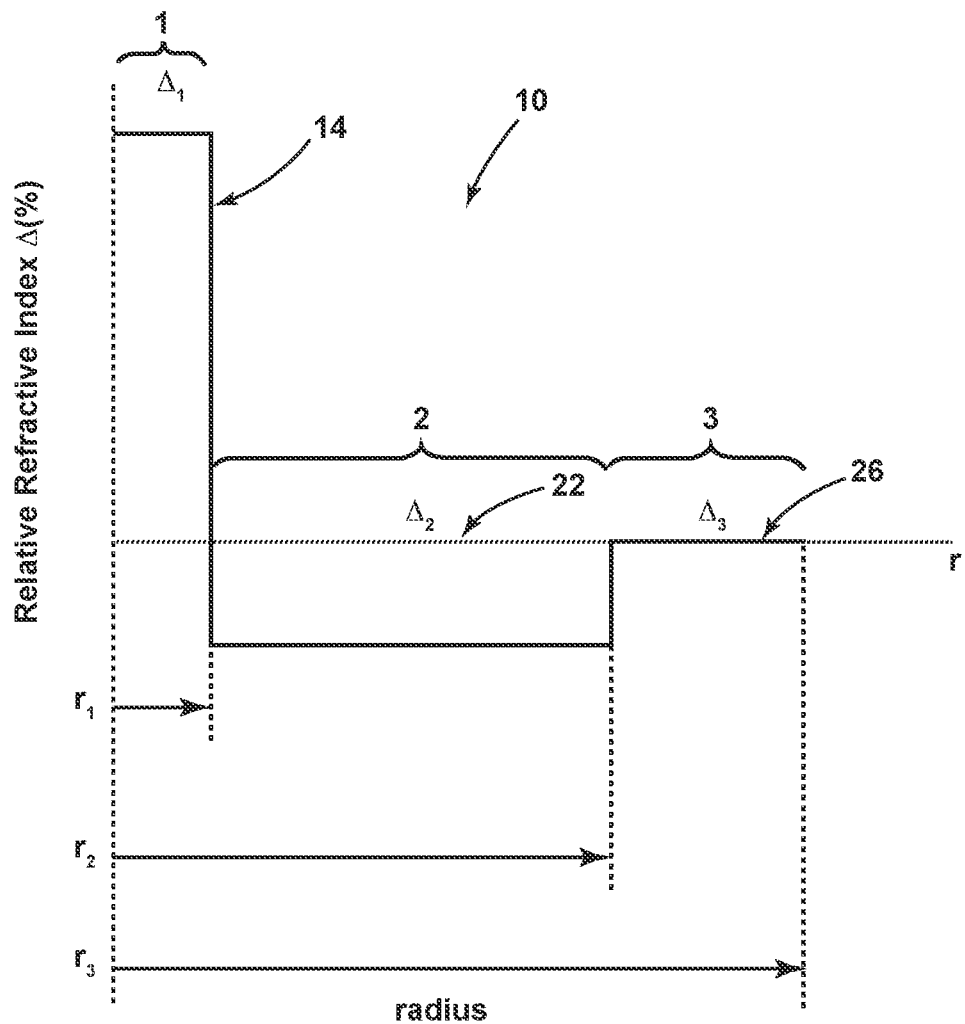
FIG. 2C is a schematic depiction of a relative refractive index profile for an optical fiber having a core and a cladding, according to at least one example.

Referring now to FIG. 2C, depicted is an example of the optical fiber 10 obtained by updoping silica glass of the core 14 with two or more halogen dopants (e.g., F, Cl, Br and/or I), using down-doped (e.g., F-doped) silica glass for the inner cladding 22, and using undoped silica glass for the outer cladding 26. The relative refractive index $\Delta_1$ of the core 14 may be from about 0.10% to 0.50%, or from about 0.20%-0.45%. For example, the relative refractive index $\Delta_1$ of the core 14 may be about 0.10%, or about 0.15%, or about 0.20%, or about 0.25%, or about 0.30%, or about 0.35%, or about 0.40%, or about 0.45%, or about 0.50% or any and all values and ranges therebetween. The radius $r_1$ of the core 14 may be from about 3 μm to about 8 μm, or from about 4 μm to about 6 μm. The relative refractive index $\Delta_2$ of the inner cladding 22 may be from about −0.40% to about −0.01%, or from about −0.35% to about −0.01%, or from about −0.30% to about −0.01%, or from about −0.25% to about −0.01%, or from about −0.20% to about −0.01%, or from about −0.15% to about −0.01%, or from about −0.10% to about −0.01%, or from about −0.05% to about −0.01%. For example, the relative refractive index $\Delta_2$ of the inner cladding 22 may be about −0.40%, or about −0.35%, or about −0.30%, or about −0.25%, or about −0.20%, or about −0.15%, or about −0.10%, or about −0.05%, or about 0.00% or any and all values and ranges therebetween. The radius $r_2$ of the inner cladding 22 may be from about 10 μm to about 40 μm, or from about 10 μm to about 35 μm, or from about 15 μm to about 40 μm, or from about 15 μm to about 38 μm, or from about 20 μm to about 38 μm, or from about 20 μm to about 35 μm, or from about 20 μm to about 30 μm, or from about 22 μm to about 38 μm, or from about 22 μm to about 35 μm, or from about 24 μm to about 38 μm, or from about 24 μm to about 35 μm or any and all values and ranges therebetween.

In down-doped examples of the inner cladding 22, the inner cladding 22 may be referred to as a "trench." The trench volume of the inner cladding 22 may be about 20% $\Delta \mu m^2$ or greater, or about 30% $\Delta \mu m^2$ or greater, or about 40% $\Delta \mu m^2$ or greater, or about 60% $\Delta \mu m^2$ or greater, or about 80% $\Delta \mu m^2$ or greater, or about 100% $\Delta \mu m^2$ or greater, or from about 20% $\Delta \mu m^2$ to about 200% $\Delta \mu m^2$, or from about 30% $\Delta \mu m^2$ to about 170% $\Delta \mu m^2$, or from about 40% $\Delta \mu m^2$ to about 140% $\Delta \mu m^2$ or any and all values and ranges therebetween.

The relative refractive index $\Delta_3$ of the outer cladding 26 may be from about −0.40% to 0.15%, or from about −0.30% to about 0.15%, or from about −0.20% to about 0.15%, or from about −0.10% to about 0.20%, or from about −0.05% to about 0.20%, or from about 0.00% to about 0.20%, or from about 0.05% to about 0.20%, or from about −0.10% to about 0.15%, or from about −0.05% to about 0.15%, or from about 0.00% to about 0.15%, or from about 0.05% to about 0.15%, or from about −0.10% to about 0.10%, or from about −0.05% to about 0.10%, or from about 0.00% to about 0.10%, or from about 0.05% to about 0.10%. The radius $r_3$ of the outer cladding 26 may be at least 55 μm, or at least 60 μm, or from about 55 μm to about 70 μm, or from about 55 μm to about 65 μm, or from about 60 μm to about 65 μm, or about 62.5 μm.

The relative refractive index difference $\Delta_1-\Delta_2$ may be about 0.15% or greater, or about 0.20% or greater, or about 0.25% or greater, or about 0.30% or greater. The relative refractive index difference $\Delta_3-\Delta_2$ may be about 0.05% or greater, or about 0.06% or greater, or about 0.08% or greater, or about 0.10% or greater, or about 0.12% or greater, or about 0.15% or greater, or about 0.20% or greater.

Figure 2D:
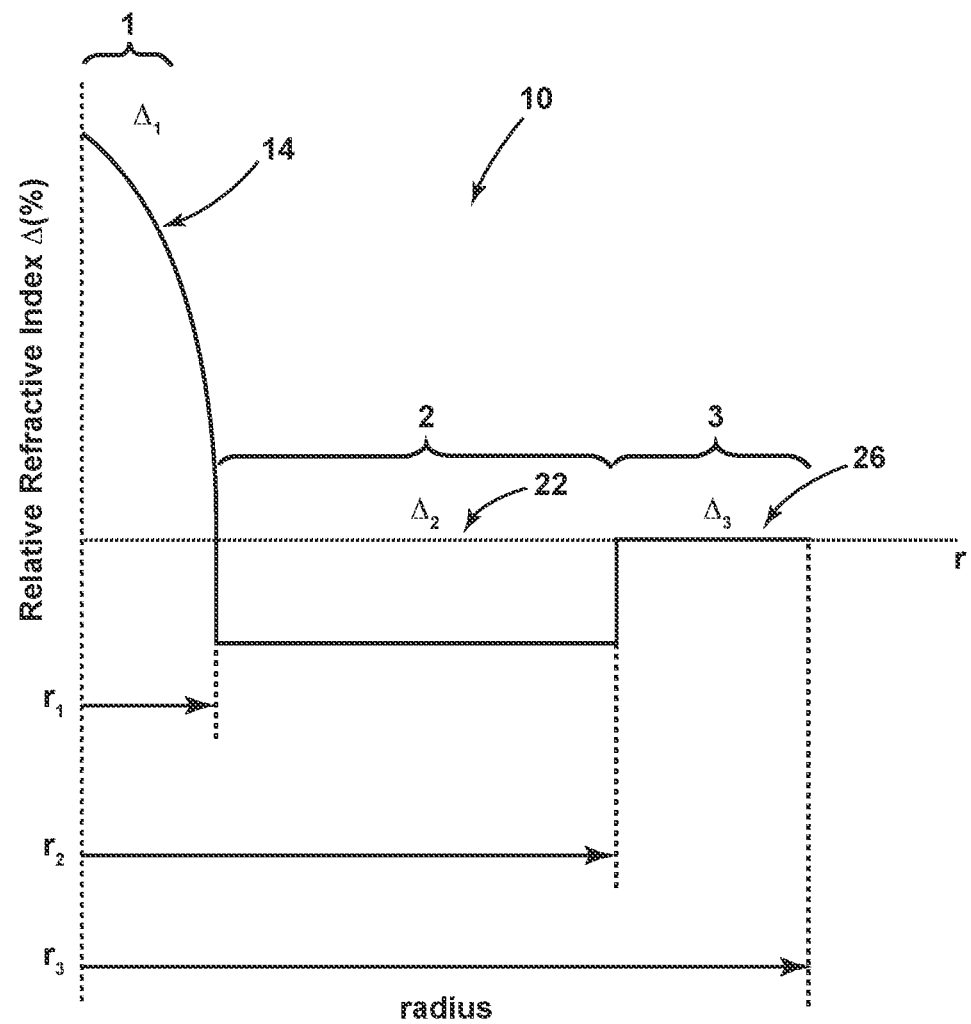
FIG. 2D is a schematic depiction of a relative refractive index profile for an optical fiber having a graded refractive index core and a cladding, according to at least one example

Referring now to FIG. 2D, depicted is an example of the optical fiber 10 obtained by updoping silica glass of the core 14 with two or more halogen dopants (e.g., Cl, Br and/or I), down-doping (e.g., with F) the inner cladding 18, and using undoped silica glass for the outer cladding 26. In the depicted example, the core 14 has a graded relative refractive index profile (e.g. an alpha profile). In such an example, core 14 can possess an alpha value of from about 0.5 to about 12. For example, the alpha value of the core may be about 0.5, or about 1.0, or about 1.5, or about 2.0, or about 2.5, or about 3.0, or about 3.5, or about 4.0, or about 4.5, or about 5.0, or about 5.5, or about 6.0, or about 6.5, or about 7.0, or about 7.5, or about 8.0, or about 8.5, or about 9.0, or about 9.5, or about 10.0, or about 10.5, or about 11, or about 11.5, or about 12.0 or any and all values and ranges therebetween. In graded relative refractive index examples, the core 14 has a relative refractive index that decreases with increasing radial distance from the optical axis of the optical fiber 10. As parts of the core 14 closer to the fiber axis have a higher relative refractive index than the parts near the cladding 18, light rays follow sinusoidal paths down the optical fiber 10. According to various examples, the relative refractive index profile for a graded index type of core 14 is very nearly parabolic (e.g. the alpha value is approximately 2.0). The parabolic profile results in continual refocusing of the light rays in the core 14 and may minimize modal dispersion. The graded relative refractive index profile of the core 14 may be obtained by varying the concentration of all dopants (e.g., Cl, Br and/or I) across the radial distance of the core 14 and/or by varying the concentration of one or more dopants across the radial distance of the core 14. It will be understood that the $\Delta_1$, the $\Delta_2$, the $\Delta_3$, the radii and the relative refractive index differences of the example depicted in FIG. 2D may have any of the above-noted values and ranges outlined above in connection with FIG. 2C.

It will be understood that one or more of the inner and outer claddings 22, 26 may be up-doped (e.g., using $B_2O_3$, Cl, Br and/or I) to increase the relative refractive index as compared to undoped silica without departing from the teachings provided herein.

Figure 3:
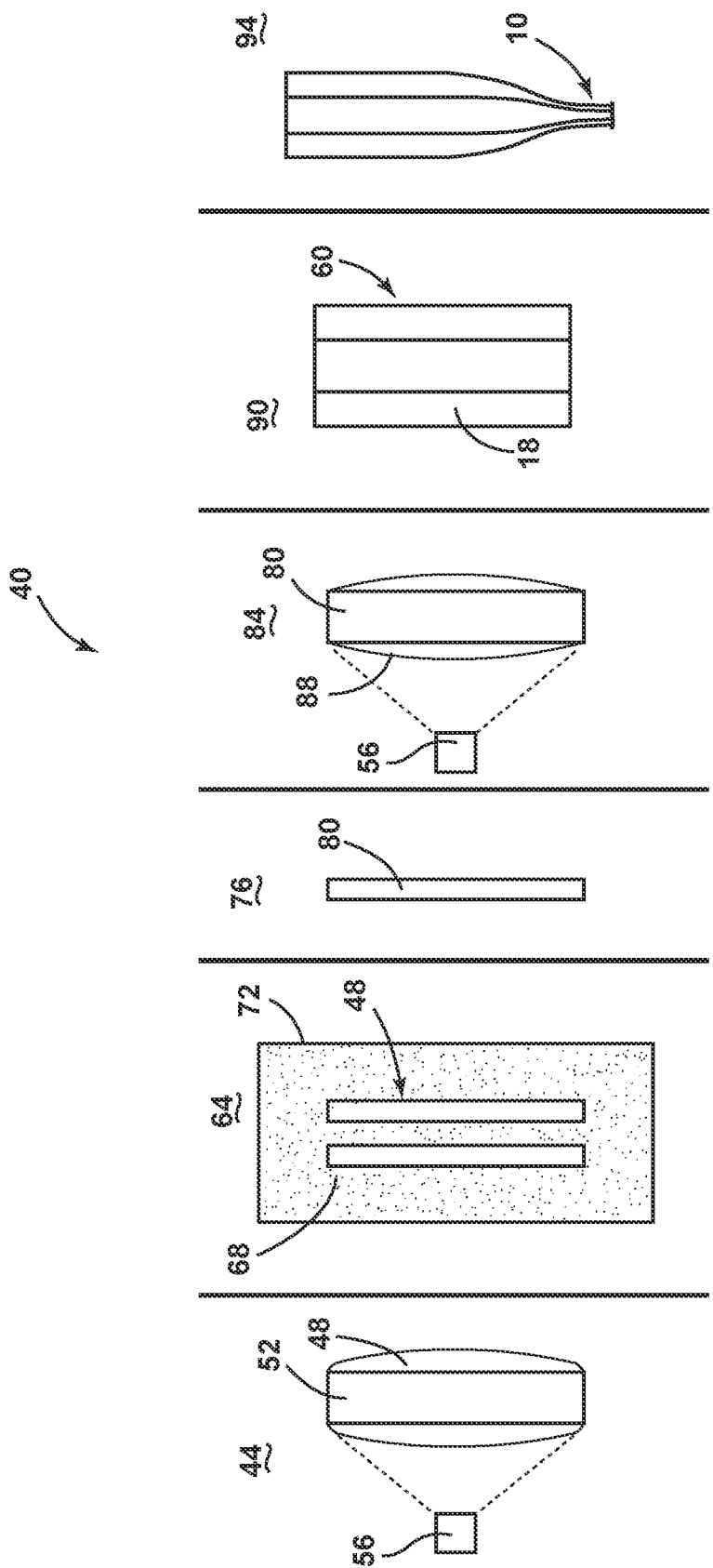
FIG. 3 is a flowchart of a method, according to at least one example.

Referring now to FIG. 3, depicted is a method 40 of forming the optical fiber 10. The method 40 may begin with a step 44 of forming a soot core preform 48 including silica. The soot core preform 48 may be formed by depositing silica-containing soot onto the outer surface of a rotating and translating bait rod 52. According to various examples, the bait rod 52 is tapered. The soot is formed by providing a soot precursor in gaseous form to a flame of a burner 56 to oxidize it. Suitable precursors for silica include octamethylcyclotetrasiloxane (OMCTS), $SiCl_4$ and other silica bearing compounds. Fuel, such as methane ($CH_4$), and a combustion supporting gas, such as oxygen, are provided to the burner 56 and ignited to form the flame. Mass flow controllers may meter the appropriate amounts of soot precursor, fuel and combustion supporting gas, all preferably in gaseous form, to the burner 56. The soot precursor is a glass former compound and is oxidized in the flame to form a generally cylindrically-shaped soot region corresponding to the soot core preform 48 of an optical fiber preform 60. After forming of the soot core preform 48, the bait rod 52 is removed to form a hollow, cylindrical soot core preform 48.

According to various examples, the soot core preform 48 may be a high soot surface area preform. For example, the surface area of the soot core preform 48 may be about 10 $m^2/gm$ or larger, about 20 $m^2/gm$ or larger, about 25 $m^2/gm$ or larger, about 50 $m^2/gm$ or larger, or about 90 $m^2/gm$ or larger. The surface area of the soot core preform 48 can be measured using Brunauer—Emmett—Teller (BET) surface area characterization techniques. Other methods that can be used to increase the soot surface area of the soot core preform 48 may include a low-density soot laydown step, a high surface area soot pressing step, and/or impregnating the soot with a sol-gel silica (e.g., TEOS, pre- or post-hydrolyzed) or nano-particle silica such as Ludox® colloidal silica.

After forming of the soot core preform, a step 64 of doping the soot core preform 48 with a dopant gas 68 is performed. The dopant gas 68 includes two or more doping precursors of the halogen dopants F, Cl, Br and I. For example, the dopant gas 68 may include doping precursors for F and Cl, F and Br, F and I, Cl and Br, Cl and I, Br and I or any combination thereof. The soot core preform 48 may be doped to the concentrations of dopants described above in connection with the core 14. The dopant gas 68 may be supplied to the soot core preform 48 in a pressure chamber 72.

Each of the two or more halogen dopants may be supplied to the soot core preform 48 as doping precursors included in dopant gas 68. Suitable bromine doping precursors include $SiBr_4$. Suitable chlorine doping precursors include $Cl_2$, $SiCl_4$, $Si_2Cl_6$, $Si_2OCl_6$, and $CCl_4$. Suitable fluorine doping precursors include $F_2$, $CF_4$, $SiF_4$, $C_2F_6$ and $SF_6$. Suitable iodine doping precursors include $SiI_4$ as well as other iodine-bearing compounds Each of the one or more or the halogen doping precursors of the dopant gas 68 may be provided to the soot core preform 48 at a partial pressure of from about 1.5 atm to about 40 atm, or from about 3.0 atm to about 30 atm, or from about 5.0 atm to about 20 atm. For example, the dopant gas 68 has a partial pressure of any of the halogen doping precursors of about 1.5 atm, or about 2.0 atm, or about 2.5 atm, or about 3.0 atm, or about 3.5 atm, or about 2.0 atm, or about 2.5 atm, or about 3.0 atm, or about 3.5 atm, or about 4.0 atm, or about 4.5 atm, or about 5.0 atm, or about 5.5 atm, or about 6.0 atm, or about 6.5 atm, or about 7.0 atm, or about 7.5 atm, or about 8.0 atm, or about 8.5 atm, or about 9.0 atm, or about 9.5 atm, or about 10 atm, or about 12 atm, or about 14 atm, or about 16 atm, or about 18 atm, or about 20 atm, or about 22 atm, or about 24 atm, or about 26 atm, or about 28 atm, or about 30 atm, or about 32 atm, or about 34 atm, or about 36 atm, or about 38 atm, or about 40 atm or any and all values and ranges therebetween. It will be understood that the partial pressure at which any of the halogen doping precursors of the dopant gas 68 is supplied to the soot core preform 48 may vary over time or may remain static.

The dopant gas 68 may be supplied to the soot core preform 48 at a temperature of from about 800° C. to about 1600° C., or from about 900° C. to about 1500° C., or from about 1000° C. to about 1550° C., or from about 1300° C. to about 1550° C., or from about 1000° C. to about 1400° C., or from about 1000° C. to about 1350° C., or from about 1200° C. to about 1300° C. For example, the dopant gas 68 may be supplied to the soot core preform 48 at a temperature of about 800° C., or about 850° C., or about 900° C., or about 950° C., or about 1000° C., or about 1050° C., or about 1100° C., or about 1150° C., or about 1200° C., or about 1250° C., or about 1300° C., or about 1350° C., or about 1400° C., or about 1450° C., or about 1500° C., or about 1550° C., or about 1600° C. or any and all values and ranges therebetween. It will be understood that the temperature of the dopant gas 68 may be varied or may be static during step 64.

During or after step 64 of doping the soot core preform 48, a step 76 of sintering the soot core preform 48 into a core cane 80 is performed. In examples where steps 64 and 76 overlap or are performed simultaneously, the doping occurs up to the point where the soot core preform 48 transforms to a fully densified, closed-pore state and becomes the core cane 80. As used herein, "fully densified" and "closed-pore state" refer to silica glass or halogen-doped silica glass having a density greater than or equal to 1.90 $g/cm^3$. According to various examples, the sintering process is an isothermal process in which the sintering temperature is from about 1100° C. to about 1600° C., or from about 1000° C. to about 1500° C., or from about 1350° C. to about 1550° C., or from about 1250° C. to about 1450° C., or from about 1380° C. to about 1500° C., or from about 1280° C. to about 1400° C. In a first example, isothermal sintering processes may be employed when the doping gas 68 is supplied as a neat gas or vapor. In a second example, the sintering process may be a downdrive process in which a sintering front is established by localized heating and the doping gas 68 is provided at the sintering front at a concentration (neat or in combination with a diluent) sufficient to accommodate the equilibrium solubility. Depending on the size of the soot core preform 48, the thermal conductivity of the soot core preform 48, and the heating (downdrive) rate of the soot core preform 48, the sinter front may include a radial temperature gradient. That is, at the sinter front, the outer surface of the soot core preform 48 is exposed to high temperatures and heated and heating of an interior portion of the soot core preform 48 follows in time as heat transfers from the outer surface to the interior of the soot core preform 48. After sintering, the soot core preform 48 is fully densified and may be drawn to a smaller diameter and cut into lengths to form consolidated co-doped silica glass core canes 80. As the core canes 80 are used to form the core 14 of the optical fiber 10, the consolidated core cane 80 may have the same compositions, dopant concentrations, dopant distribution, and relative refractive index described above in connection with the core 14.

Next, a step 84 of applying an overcladding 88 to the core cane 80 is performed. Step cane 80 may be accomplished by applying additional soot to form the overcladding 88 (i.e., from the burner 56). The soot of the overcladding 88 is used to form the cladding 18. In examples where the cladding 18 includes the inner cladding 22 and the outer cladding 26, the overcladding 88 is applied in separate successive steps (i.e., each step being a different layer of the cladding 18 such as the inner cladding 22 and the outer cladding 26 as well as any intermediate cladding layers). The overcladding 88 may be deposited onto the core cane 80 using the same method as explained above with respect to the deposition process of the soot core preform 48. The additional soot of the overcladding 88 is supported by the core cane 80 around which the additional soot has been deposited. As described above, the inner cladding 22 can be undoped silica or doped silica. Doping of the inner cladding 22 can be accomplished by exposing the soot of the overcladding 88 corresponding to the inner cladding 22 to a doping precursor before consolidation in the same manner described above for the soot core preform 48.

Next, a step 90 of sintering the overcladding 88 into the cladding 22 around the core cane 80 is performed to form optical fiber preform 60. The overcladding 88 may be sintered at a temperature of from about 1100° C. to about 1600° C., or from about 1000° C. to about 1500° C., or from about 1350° C. to about 1550° C., or from about 1250° C. to about 1450° C., or from about 1380° C. to about 1500° C., or from about 1280° C. to about 1400° C. It will be understood that if the cladding 18 includes both the inner cladding 22 and the outer cladding 26, steps 84 and 90 may be repeated (e.g., with or without doping) to form the inner cladding 22 and the outer cladding 26.

Next, a step 94 of drawing the optical fiber 10 from the optical fiber preform 60 (i.e., the cladding 18 and core cane 80) is performed. Step 94 may be carried out by inserting the optical fiber preform 60 into a draw furnace and heating the optical fiber preform 60 to soften the glass. The optical fiber 10 is pulled from a root portion of the optical fiber preform 60 by a tractor. After leaving the draw furnace, the optical fiber 10 encounters a diameter monitor which provides a signal that is used in a feedback control loop to regulate the speed of the tractor to maintain a constant diameter of the fiber 10. The optical fiber 10 then passes through a fiber tension measurement device that measures the tension of the optical fiber 10 caused by pulling the optical fiber 10 from the preform 60. After exiting the draw furnace, the optical fiber 10 can be further processed in cooling, annealing, reheating, coating (i.e., to create the primary and/or secondary coatings 30, 34) and winding steps.

Use of the present disclosure may offer a variety of advantages. First, as the core 14 of the optical fiber 10 is co-doped with two or more halogen dopants (i.e., Cl, F, Br and/or I), the optical fiber 10 may obtain sufficient relative refractive index of the core 14 relative to the cladding 18 at moderate doping pressures. As discussed above, conventional doping schemes involving halogen dopants often utilize high doping pressures to reach sufficient doping concentrations in the core 14. Utilization of multiple halogen dopants permits dopants (e.g., Br and I) with a greater effective increase on the refractive index of silica glass (per unit wt %) and which may be doped to a greater wt % at lower pressures to be co-doped with dopants (e.g., Cl and F) that have a lower effect on Rayleigh scattering of light transmitted through the optical fiber 10. As a result, the optical fiber 10 can be produced at a lower pressure than conventional waveguides while also maintaining scattering and waveguide function within prescribed standards and specifications.

Second, the co-doping of the core 14 of the optical fiber 10 with two or more halogens lowers the viscosity of the silica glass of the core 14. Such a feature is advantageous in increasing relaxation of the silica glass of the core 14 while being drawn (i.e., at step 94) and also decreasing the fictive temperature of the silica glass of the core 14. As glass relaxation is greater while being drawn and the fictive temperature of the silica glass is lower, less stress-induced optical defects may occur in the optical fiber 10. Such a feature is advantageous as less stress-induced optical defects may decrease the attenuation of the optical fiber 10 produced by drawing.

Third, as the core 14 of the optical fiber 10 may have a relative refractive index profile which is graded, trenches (i.e., as depicted in FIGS. 2C and 2D) in the relative refractive index profile of the cladding 18 of the optical fiber 10 may be positioned next to or adjacent the core 14. Such a feature may be advantageous in reducing the number of manufacturing steps in production of the optical fiber 10 as the trench may not need to be offset from the core 14 to meet dispersion standards and specifications.

Fourth, as the core 14 of the optical fiber 10 may be doped with sufficient quantities of F, Cl, Br and/or I to produce the necessary refractive index delta between the core 14 and the cladding 18, the optical fiber 10 may be substantially or wholly free of Ge. As explained above, use of Ge as an index-raising dopant for silica cores may tend to increase the Rayleigh scattering of the optical fiber 10 relative to undoped silica fibers. As such, the minimization or removal of Ge from the core 14, and replacing it with two or more halogen dopants, may provide lower attenuation of the core 14 while providing a sufficient refractive index delta between the core 14 and the cladding 18 to produce a well-guided waveguide.

Fifth, as doping of the core 14 of the optical fiber 10 may achieve a sufficient relative refractive index delta, doping of the cladding 18 may not be necessary. For example, if the relative refractive index of the core 14 is sufficiently high, the cladding 18 may not need to be doped with one or more down-dopants to achieve an adequate difference in the relative refractive index between the core 14 and the cladding 18 (e.g., FIG. 2A).

EXAMPLES

Provided below are non-limiting examples of the present disclosure.

Figure 4A:
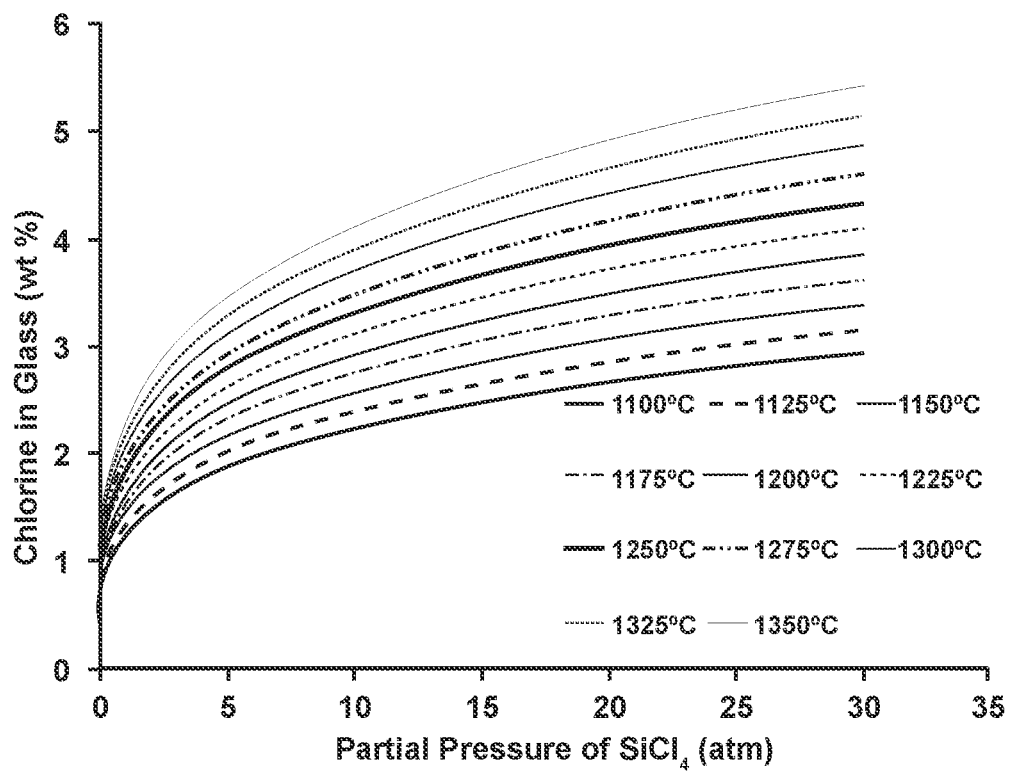
FIG. 4A is a plot of $SiCl_4$ partial pressure vs. Cl (wt %) in a glass sample for a variety of temperatures.
Figure 4B:
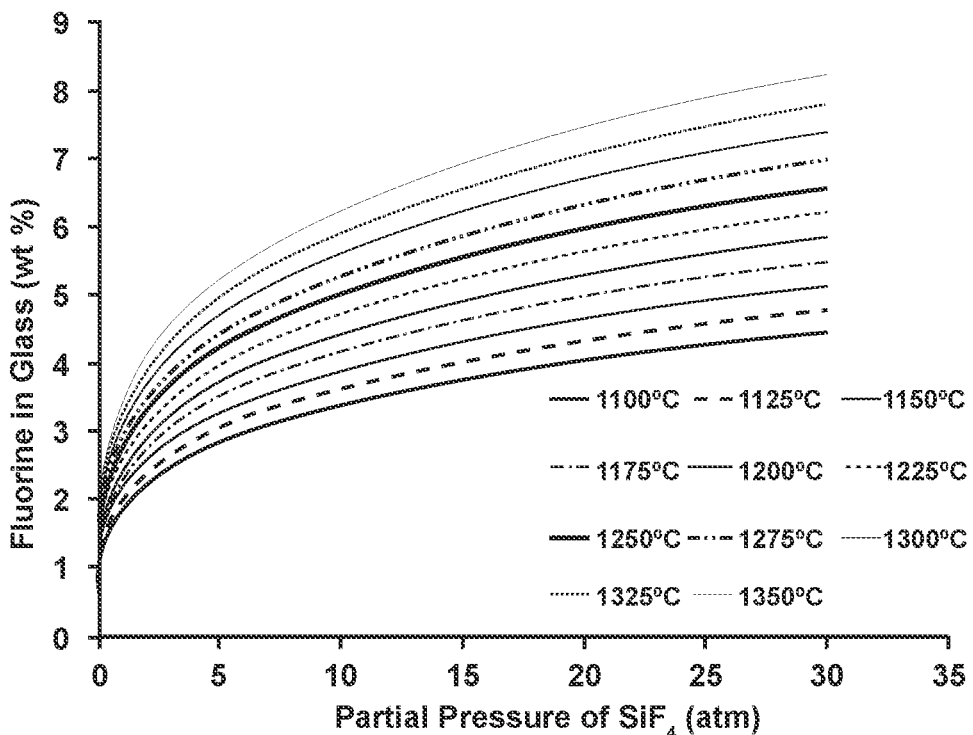
FIG. 4B is a plot of $SiF_4$ partial pressure vs. F (wt %) in a glass sample for a variety of temperatures.

Referring now to FIGS. 4A and 4B, depicted are plots showing the dopant concentration of Cl and F in weight percent (wt %) in silica glass when a soot preform (e.g., the soot core preform 48) is doped with $SiCl_4$ or $SiF_4$, respectively, as a doping precursor in the dopant gas 68 at various doping temperatures. The concentration of chlorine in the silica glass is shown as a function of temperature at which the doping is performed in FIG. 4A. As evident from the slope of the various temperature curves, relatively high doping pressures and temperatures may be needed to dope Cl into the soot preform. Further, as Cl has a comparatively low impact on the relative refractive index of silica, the high doping pressures and temperatures may be necessary to reach a sufficient doping concentration (wt %) of Cl to produce a well-guided waveguide. Concentration of doped F and Cl in silica is seen to scale with partial pressure of doping precursor according to a power law with an exponent of about $1/4$ when $SiCl_4$ and $SiF_4$ are used as doping precursors.

Figure 4C:
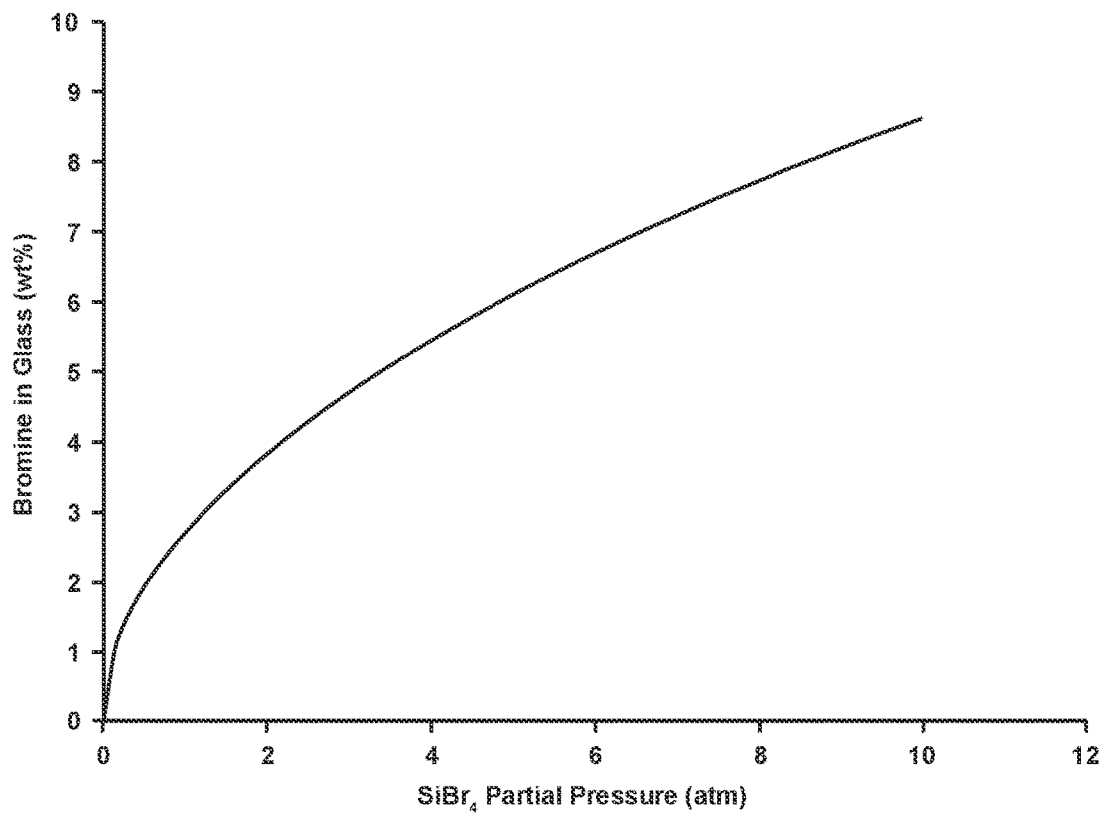
FIG. 4C is a plot of $SiBr_4$ partial pressure vs. Br (wt %) in a glass.

Referring now to FIG. 4C depicted is a plot showing the concentration of Br in weight % that is doped in silica glass when a soot preform is doped with a doping gas 68 that includes $SiBr_4$ as a doping precursor in a doping process in which the silica soot preform was down driven through a furnace maintained at a temperature of 1490° C. The doping concentration of Br as a function of $SiBr_4$ partial pressure is observed to scale with a power law relation having an exponent of about $1/2$.

As is clear from FIGS. 4A-4C, the doping concentration achieved with F and Br (in terms of wt %) is more efficient than Cl for the same partial pressure of doping precursor in dopant gas 68. Furthermore, the absolute relative refractive index difference per wt % dopant is larger for Br and F than for Cl. As a result, it is possible to achieve index differential by co-doping the core region (e.g., the core 14 of the optical fiber 10) with two or more halogen dopants at moderate pressures.

Figure 5:
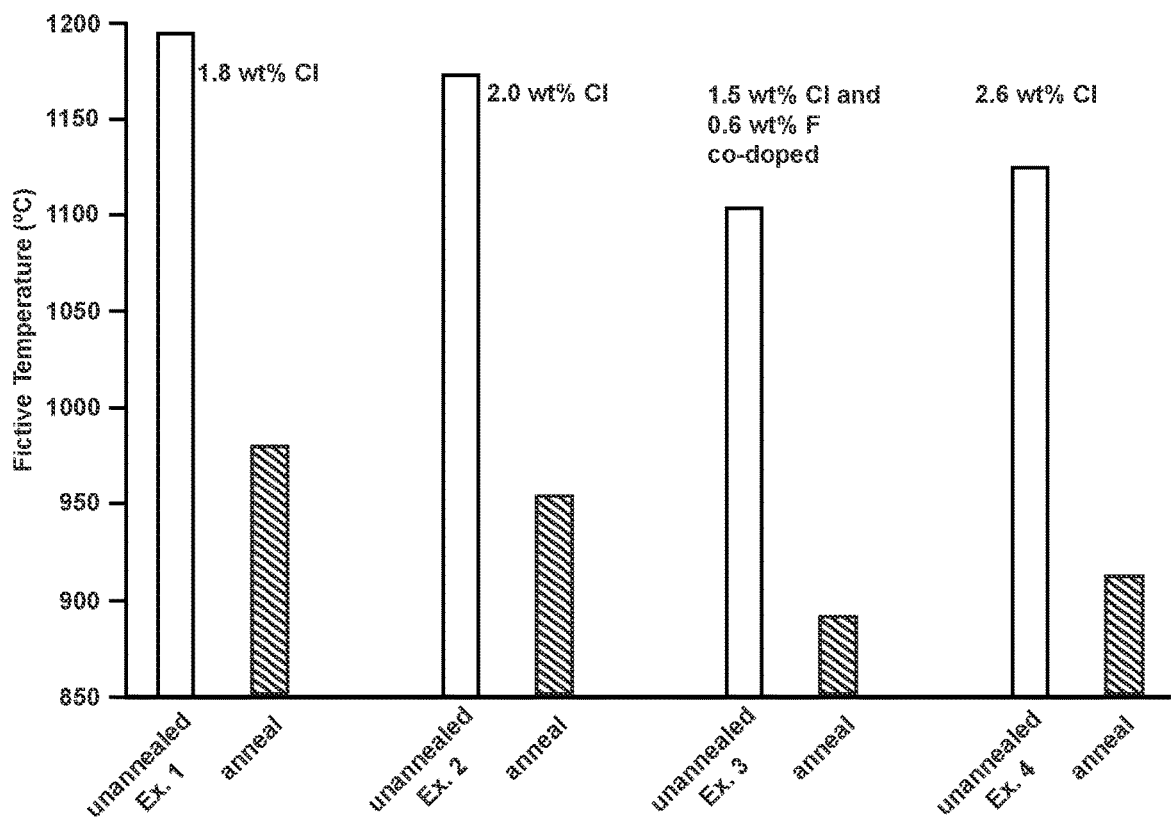
FIG. 5 is a bar chart of fictive temperatures for both comparative examples and an example of the present disclosure.

Referring now to FIG. 5, a bar chart is provided of fictive temperatures for a variety of single doped (i.e., with just Cl) and co-doped (i.e., Cl and F) silica cores (e.g., the core cane 80) in both unannealed (i.e., as-formed) and post-anneal states. The annealing schedule was ramping the cores to a temperature of 1200° C. as fast as possible, holding the cores at a temperature of 1200° C. for 1 hour, ramping the cores to a temperature of 900° C. at a rate of 100° C. per hour and ramping to room temperature at furnace rate. The silica cores were formed in manner consistent with the method 40 described above. As FIG. 5 indicates, the fictive temperature of the Cl and F co-doped silica core example was lower by as much as 80° C. in both the as-formed (unannealed) and post-anneal states compared to the fictive temperatures observed for the comparative silica core example samples possessing a single, Cl dopant. It is expected that these observed fictive temperature differences between the co-doped silica core example and the comparative silica core examples with a single dopant will also be manifested in optical fibers drawn from these canes, at least based on increased glass relaxation levels during the fiber drawing process. Further, it is expected that the use of a different grouping of co-dopants (i.e., F and Br, F and I, Cl and Br, Cl and I, Br and I) would produce the same or similar results as provided in FIG. 5.

The following tables represent concentrations of halogens in co-doped silica cores:

TABLE 1

Halogen Co-Doped Silica Cores

| Cl (wt %) | F (wt %) | Total Halogen (wt %) | Halogen Co-Doping Ratio of Cl |
|---|---|---|---|
| 0.28 | 1.11 | 1.38 | 20% |
| 0.46 | 1.07 | 1.53 | 30% |
| 0.68 | 1.02 | 1.70 | 40% |
| 0.96 | 0.96 | 1.92 | 50% |
| 1.32 | 0.88 | 2.20 | 60% |
| 1.81 | 0.77 | 2.58 | 70% |
| 2.50 | 0.63 | 3.13 | 80% |
| 3.56 | 0.40 | 3.95 | 90% |

TABLE 2

Halogen Co-Doped Silica Cores

| Cl (wt %) | F (wt %) | Total Halogen (wt %) | Halogen Co-Doping Ratio of Cl |
|---|---|---|---|
| 0.24 | 0.95 | 1.19 | 20% |
| 0.39 | 0.92 | 1.31 | 30% |
| 0.58 | 0.87 | 1.46 | 40% |
| 0.82 | 0.82 | 1.64 | 50% |
| 1.13 | 0.75 | 1.89 | 60% |
| 1.55 | 0.66 | 2.21 | 70% |
| 2.14 | 0.54 | 2.68 | 80% |
| 3.05 | 0.34 | 3.39 | 90% |

TABLE 3

Halogen Co-Doped Silica Cores

| Cl (wt %) | F (wt %) | Total Halogen (wt %) | Halogen Co-Doping Ratio of Cl |
|---|---|---|---|
| 0.40 | 1.58 | 1.98 | 20% |
| 0.65 | 1.53 | 2.18 | 30% |
| 0.97 | 1.46 | 2.43 | 40% |
| 1.37 | 1.37 | 2.74 | 50% |
| 1.89 | 1.26 | 3.14 | 60% |
| 2.58 | 1.11 | 3.69 | 70% |
| 3.57 | 0.89 | 4.46 | 80% |
| 5.08 | 0.56 | 5.65 | 90% |

TABLE 4

Halogen Co-Doped Silica Cores

| Cl (wt %) | Br (wt %) | Total Halogen (wt %) | Halogen Co-Doping Ratio of Cl |
|---|---|---|---|
| 0.72 | 2.89 | 3.61 | 20% |
| 1.13 | 2.63 | 3.76 | 30% |
| 1.57 | 2.36 | 3.93 | 40% |
| 2.06 | 2.06 | 4.12 | 50% |
| 2.59 | 1.73 | 4.32 | 60% |
| 3.18 | 1.36 | 4.55 | 70% |
| 3.84 | 0.96 | 4.79 | 80% |
| 4.57 | 0.51 | 5.07 | 90% |

TABLE 5

Halogen Co-Doped Silica Cores

| Cl (wt %) | Br (wt %) | Total Halogen (wt %) | Halogen Co-Doping Ratio of Cl |
|---|---|---|---|
| 0.62 | 2.47 | 3.09 | 20% |
| 0.97 | 2.26 | 3.23 | 30% |
| 1.35 | 2.02 | 3.37 | 40% |
| 1.76 | 1.76 | 3.53 | 50% |
| 2.22 | 1.48 | 3.70 | 60% |
| 2.73 | 1.17 | 3.90 | 70% |
| 3.29 | 0.82 | 4.11 | 80% |
| 3.91 | 0.43 | 4.35 | 90% |

TABLE 6

Halogen Co-Doped Silica Cores

| Cl (wt %) | Br (wt %) | Total Halogen (wt %) | Halogen Co-Doping Ratio of Cl |
|---|---|---|---|
| 1.03 | 4.12 | 5.15 | 20% |
| 1.61 | 3.76 | 5.38 | 30% |
| 2.25 | 3.37 | 5.62 | 40% |
| 2.94 | 2.94 | 5.88 | 50% |
| 3.70 | 2.47 | 6.17 | 60% |
| 4.55 | 1.95 | 6.49 | 70% |
| 5.48 | 1.37 | 6.85 | 80% |
| 6.52 | 0.72 | 7.25 | 90% |

Example Co-Doping Experiment Procedure

A $SiO_2$ soot blank, or preform, was formed by an outside vapor deposition process using 2500 grams of $SiO_2$ soot having a density of 0.45 g/cc. In some examples, the outside vapor deposition process may include depositing the $SiO_2$ soot onto a removable alumina bait rod approximately 1 meter long×10 mm in diameter. The alumina bait rod was removed. The $SiO_2$ soot blank was dried with a dehydration agent and then doped in an atmosphere consisting of $SiBr_4$ and $SiCl_4$ followed by a sintering process. The sintering process included preheating the $SiO_2$ soot blank in a furnace having a temperature of 1225° C. for two hours followed by drying for two hours in an atmosphere of 97.5 percent helium and 2.5 percent chlorine at 1225° C. The preform was then co-doped in the presence of $SiBr_4$ and $SiCl_4$ for 30 minutes at 1225° C., followed by sintering in presence of $SiBr_4$ and $SiCl_4$ in a furnace environment having a peak temperature of 1490° C. Four experiments having different partial pressures of $SiBr_4$ and $SiCl_4$ were performed. The $SiBr_4$ and $SiCl_4$ partial pressures in the sintering and doping steps of each experiment are shown in Table 7. The resulting amount of chlorine and bromine doped in silica is shown in Table 8.

Table 7 represents process flow rates in standard liters per minute (SLPM) and partial pressures of $SiCl_4$ and $SiBr_4$ in atmospheres (atm) used in the four co-doping experiments on silica soot preforms:

TABLE 7

| | $SiCl_4$ (SLPM) | He (SLPM) | $SiBr_4$ (SLPM) | $P_{SiCl4}$ (atm) | $P_{SiBr4}$ (atm) | Total $P_{SiX4}$ (atm) | $[SiCl_4]/[SiBr_4]$ |
|---|---|---|---|---|---|---|---|
| Expt #1 | 1.97 | 3.00 | 0.35 | 0.37 | 0.07 | 0.44 | 5.63 |
| Expt #2 | 1.66 | 2.00 | 1.05 | 0.35 | 0.22 | 0.58 | 1.58 |
| Expt #3 | 1.65 | 1.20 | 1.36 | 0.39 | 0.32 | 0.71 | 1.21 |
| Expt #4 | 2.20 | 2.00 | 1.03 | 0.42 | 0.20 | 0.62 | 2.14 |

Table 8 represents the amount of chlorine and bromine incorporated in the silica glass and the amount of relative refractive increase achieved (with respect to silica) for the four experiments performed:

TABLE 8

| | [Cl] (wt %) | [Br] (wt %) | [Cl]/[Br] | Delta (%) |
|---|---|---|---|---|
| Expt #1 | 1.53 | 0.31 | 4.94 | 0.133 |
| Expt #2 | 1.06 | 1.03 | 1.03 | 0.173 |
| Expt #3 | 1.06 | 1.29 | 0.82 | 0.196 |
| Expt #4 | 1.28 | 0.96 | 1.33 | 0.174 |

Referring now to FIG. 6, depicted is a plot of various combinations of $SiCl_4$ and $SiBr_4$ partial pressures vs. relative refractive index increase. The relative refractive index increase with respect to silica achieved by co-doping with $SiCl_4$ and $SiBr_4$ are shown as a function of mole fraction of $SiCl_4$ in $SiCl_4$-$SiBr_4$ gas mixture for different total gas partial pressures. Curve 1 shows a % Δ increase in relative refractive index with respect to silica achieved as a result of co-doping with $SiCl_4$ and $SiBr_4$ as a function of $SiCl_4$ and $SiBr_4$ partial pressures for total gas pressure of 1 atm. Curve 2 shows a % Δ increase in relative refractive index with respect to silica achieved as a result of co-doping with $SiCl_4$ and $SiBr_4$ as a function of $SiCl_4$ and $SiBr_4$ partial pressures for total gas pressure of 2 atm. Curve 3 shows a % Δ increase in relative refractive index with respect to silica achieved as a result of co-doping with $SiCl_4$ and $SiBr_4$ as a function of $SiCl_4$ and $SiBr_4$ partial pressures for total gas pressure of 3 atm. As evident from the curves 1, 2 and 3, the refractive index increase is not monotonic, which is an unexpected result. Specifically, curves 1, 2 and 3 show an increasing trend in relative refractive index increase, followed by a decreasing trend in relative refractive index increase. The maximum relative refractive index increases appear to occur at $SiCl_4$ mole fraction in the ($SiCl_4$+$SiBr_4$) gas mixture of approximately 0.110-0.260 for total pressures of 1-3 atm. Specifically, for curve 1 the maxima occurs at $SiCl_4$ mole fraction in the ($SiCl_4$+$SiBr_4$) gas mixture of approximately 0.150-0.260 atm. For curve 2 the maxima occurs at $SiCl_4$ mole fraction in the ($SiCl_4$+$SiBr_4$) gas mixture of approximately 0.135-0.190 atm. Lastly, the maxima for curve 3 takes place at $SiCl_4$ mole fraction in the ($SiCl_4$+$SiBr_4$) gas mixture of approximately 0.110-0.187 atm.

Aspect 1 of the description is:
A method of forming an optical fiber, comprising:
exposing a soot core preform to a dopant gas at a pressure of from 1.5 atm to 40 atm, the soot core preform comprising silica, the dopant gas comprising a first halogen doping precursor and a second halogen doping precursor, the first halogen doping precursor doping the soot core preform with a first halogen dopant and the second halogen precursor doping the soot core preform with a second halogen dopant; and
sintering the soot core preform to form a halogen-doped closed-pore body, the halogen-doped closed-pore body having a combined concentration of the first halogen dopant and the second halogen dopant greater than 2.0 wt %.

Aspect 2 of the description is:
The method of Aspect 1, wherein the first halogen dopant is Cl.

Aspect 3 of the description is:
The method of Aspect 2, wherein the Cl dopant has a halogen co-doping ratio in a range from 20% to 90% in the halogen-doped closed-pore body.

Aspect 4 of the description is:
The method of Aspect 2, wherein the second halogen dopant is Br.

Aspect 5 of the description is:
The method of any of Aspects 1-4, wherein the combined concentration of the first halogen dopant and the second halogen dopant is in the range from 3.0 wt % to 8.0 wt %.

Aspect 6 of the description is:
The method of any of Aspects 1-5, wherein the exposing of the soot core preform is performed at a temperature of from 1300° C. to 1550° C.

Aspect 7 of the description is:
The method of any of Aspects 1-6, wherein the soot core preform is substantially free of Ge.

Aspect 8 of the description is:
The method of any of Aspects 1-7, wherein the dopant gas is at a pressure of from about 3 atm to about 30 atm.

Aspect 9 of the description is:
The method of any of Aspects 1-7, wherein the dopant gas is at a pressure of from about 5 atm to about 20 atm.

Aspect 10 of the description is:
The method of any of Aspects 1-9, wherein the first halogen doping precursor has a partial pressure in the dopant gas in a range from 1.5 atm to 40 atm.

Aspect 11 of the description is:
The method of Aspect 10, wherein the second halogen doping precursor has a partial pressure in the dopant gas in a range from 1.5 atm to 40 atm.

Aspect 12 of the description is:
The method of any of Aspects 1-11, wherein the halogen-doped closed-pore body has a relative refractive index in a range from 0.10% to 0.50%.

Aspect 13 of the description is:
A method of forming an optical fiber, comprising:
exposing a soot core preform to a dopant gas at a pressure of from about 1.5 atm to about 40 atm, the soot core preform comprising silica, the dopant gas comprising a Cl doping precursor and a second halogen doping precursor, the Cl doping precursor doping the soot core preform with a Cl dopant and the second halogen precursor doping the soot core preform with a second halogen dopant; and
sintering the soot core preform to form a halogen-doped closed-pore body, the halogen-doped closed-pore body having a combined concentration of the Cl dopant and the second halogen dopant of at least 2.0 wt %, wherein the Cl dopant has a halogen co-doping ratio in a range from 20% to 90%.

Aspect 14 of the description is:
The method of Aspect 13, wherein the Cl dopant has a halogen co-doping ratio in a range from 20% to 80% in the halogen-doped closed-pore body.

Aspect 15 of the description is:

The method of Aspect 13, wherein the Cl dopant has a halogen co-doping ratio in a range from 20% to 60% in the halogen-doped closed-pore body.

Aspect 16 of the description is:

The method of any of Aspects 13-15, wherein the soot core preform is doped with the dopant gas at a pressure of from about 3 atm to about 30 atm.

Aspect 17 of the description is:

The method of any of Aspects 13-16, wherein the halogen-doped closed-pore body has a relative refractive index in a range from 0.10% to 0.50%.

Aspect 18 of the description is:

An optical fiber, comprising:
a cladding; and
a core positioned within the cladding, the core comprising a Cl dopant and a second halogen dopant, the Cl dopant and the second halogen dopant having a combined concentration in the core in a range from 2.0 wt % to 7.5 wt %, the Cl dopant having a halogen co-doping ratio in a range from 20% to 90% in the core.

Aspect 19 of the description is:

The optical fiber of Aspect 18, wherein the second halogen dopant is F.

Aspect 20 of the description is:

The optical fiber of Aspect 18 or 19, wherein the concentration of Cl in the core is at least 0.6 wt % and the concentration of F in the core is at least 0.4 wt %.

Aspect 21 of the description is:

The optical fiber of Aspect 18, wherein the second halogen dopant is Br.

Aspect 22 of the description is:

The optical fiber of Aspect 21, wherein the concentration of Cl in the core is at least 0.6 wt % and the concentration of Br in the core is at least 0.4 wt %.

Aspect 23 of the description is:

The optical fiber of any of Aspects 18-22, wherein the cladding comprises undoped silica.

Aspect 24 of the description is:

The optical fiber of any of Aspects 18-22, wherein the cladding comprises fluorine.

Aspect 25 of the description is:

The optical fiber of any of Aspects 18-24, wherein the core comprises a graded refractive index profile with an alpha value of about 12 or less.

Aspect 26 of the description is:

The optical fiber of any of Aspects 18-25, wherein the core comprises an unannealed fictive temperature of from about 1050° C. to about 1110° C.

Aspect 27 of the description is:

The optical fiber of any of Aspects 18-26, wherein the optical fiber has an attenuation of less than about 0.18 dB/km at 1550 nm.

Aspect 28 of the description is:

The optical fiber of any of Aspects 18-27, wherein the core has a relative refractive index in a range from 0.10% to 0.50% and the cladding has a relative refractive index in a range from −0.35% to 0.20%.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise.

What is claimed is:

1. A method of forming an optical fiber, comprising:
exposing a soot core preform to a dopant gas at a pressure of from 1.5 atm to 40 atm, the soot core preform comprising silica, the dopant gas comprising a first halogen doping precursor and a second halogen doping precursor, the first halogen doping precursor doping the soot core preform with a first halogen dopant and the second halogen precursor doping the soot core preform with a second halogen dopant; and
sintering the soot core preform to form a halogen-doped closed-pore body, wherein the first halogen dopant comprises Cl having a doping concentration greater than 1.8 wt % and a halogen co-doping ratio in a range from 20% to about 90% in the halogen-doped closed-pore body.

2. The method of claim 1, wherein the second halogen dopant is Br.

3. The method of claim 1, wherein the combined concentration of the first halogen dopant and the second halogen dopant is in a range from 2.0 wt % to 8.0 wt %.

4. The method of claim 1, wherein the exposing of the soot core preform is performed at a temperature of from 1300° C. to 1550° C.

5. The method of claim 1, wherein the soot core preform is substantially free of Ge.

6. The method of claim 1, wherein the dopant gas is at a pressure of from about 3 atm to about 30 atm.

7. The method of claim 1, wherein the dopant gas is at a pressure of from about 5 atm to about 20 atm.

8. The method of claim 1, wherein the first halogen doping precursor has a partial pressure in the dopant gas in a range from 1.5 atm to 40 atm.

9. The method of claim 8, wherein the second halogen doping precursor has a partial pressure in the dopant gas in a range from 1.5 atm to 40 atm.

10. The method of claim 1, wherein the halogen-doped closed-pore body has a relative refractive index in a range from 0.10% to 0.50%.

11. A method of forming an optical fiber, comprising:
exposing a soot core preform to a dopant gas at a pressure of from about 1.5 atm to about 40 atm, the soot core preform comprising silica, the dopant gas comprising a Cl doping precursor and a second halogen doping precursor, the Cl doping precursor doping the soot core preform with a Cl dopant and the second halogen precursor doping the soot core preform with a second halogen dopant; and sintering the soot core preform to form a halogen-doped closed-pore body, wherein the Cl dopant comprises a doping concentration from 1.8 wt % to about 4.0 wt % and a halogen co-doping ratio in a range from 20% to about 90% in the halogen-doped closed-pore body.

12. The method of claim 11, wherein the Cl dopant has a halogen co-doping ratio in a range from 20% to 80% in the halogen-doped closed-pore body.

13. The method of claim 11, wherein the Cl dopant has a halogen co-doping ratio in a range from 20% to 60% in the halogen-doped closed-pore body.

14. The method of claim 11, wherein the soot core preform is doped with the dopant gas at a pressure of from about 3 atm to about 30 atm.

15. The method of claim 11, wherein the halogen-doped closed-pore body has a relative refractive index in a range from 0.10% to 0.50%.

16. An optical fiber, comprising:
a cladding comprising undoped silica; and
a core positioned within the cladding, the core comprising a first halogen dopant and a second halogen dopant, the first halogen dopant comprising a Cl dopant having a doping concentration greater than 1.8 wt % and a halogen co-doping ratio in a range from 20% to 90%,
wherein the optical fiber has an attenuation of less than about 0.18 dB/km at 1550 nm.

17. The optical fiber of claim 16, wherein the second halogen dopant is F.

18. The optical fiber of claim 17, wherein the concentration of Cl in the core is at least 2.0 wt % and the concentration of F in the core is at least 0.4 wt %.

19. The optical fiber of claim 16, wherein the second halogen dopant is Br.

20. The optical fiber of claim 19, wherein the concentration of Cl in the core is at least 2.0 wt % and the concentration of Br in the core is at least 0.4 wt %.

21. The optical fiber of claim 16, wherein the core comprises a graded refractive index profile with an alpha value of about 12 or less.

22. The optical fiber of claim 16, wherein the core comprises an unannealed fictive temperature of from about 1050° C. to about 1110° C.

23. The optical fiber of claim 16, wherein the core has a relative refractive index in a range from 0.10% to 0.50% and the cladding has a relative refractive index in a range from −0.35% to 0.20%.

* * * * *

UNITED STATES PATENT AND TRADEMARK OFFICE
CERTIFICATE OF CORRECTION

PATENT NO. : 11,175,450 B2
APPLICATION NO. : 16/529179
DATED : November 16, 2021
INVENTOR(S) : Dana Craig Bookbinder et al.

Page 1 of 1

It is certified that error appears in the above-identified patent and that said Letters Patent is hereby corrected as shown below:

In the Claims

In Column 22, Line 32, Claim 1, delete "CI" and insert -- Cl --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*